J. M. HUNT.
INNER TUBE.
APPLICATION FILED NOV. 6, 1915.
1,177,627.
Patented Apr. 4, 1916.
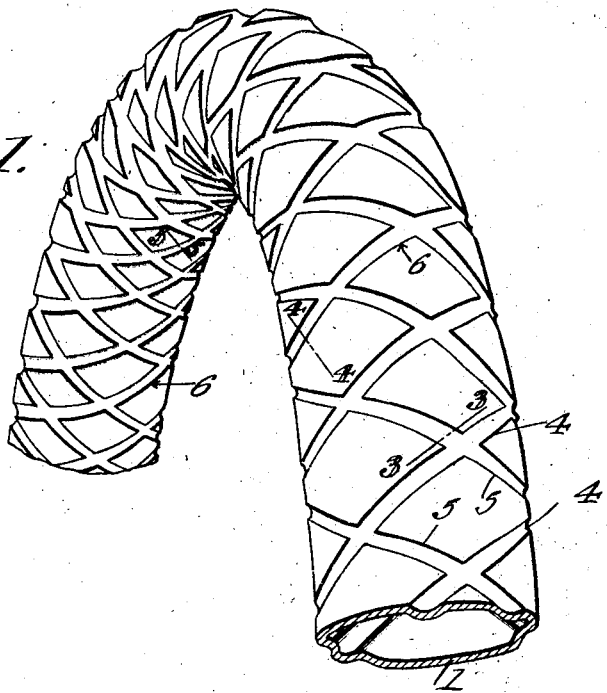
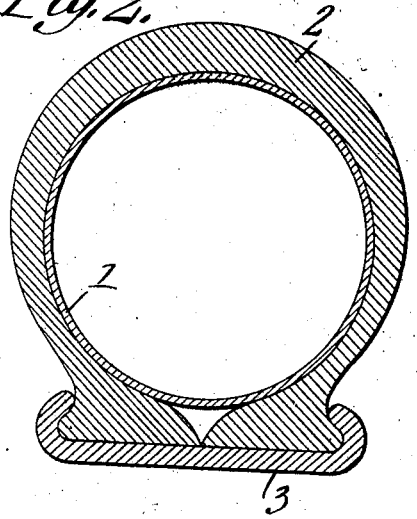
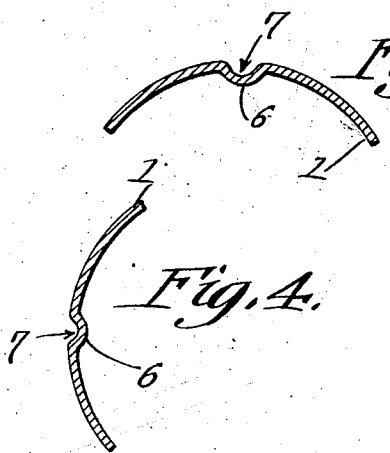
Witnesses
J. R. Tomlin
R. L. Parker
J. M. Hunt, Inventor
by C. A. Snow & Co., Attorneys

UNITED STATES PATENT OFFICE.

JOHN MALLORY HUNT, OF ATLANTA, GEORGIA.

INNER TUBE.

1,177,627.
Specification of Letters Patent.
Patented Apr. 4, 1916.

Application filed November 6, 1915. Serial No. 60,095.

*To all whom it may concern:*

Be it known that I, JOHN MALLORY HUNT, a citizen of the United States, residing at Atlanta, in the county of Fulton and State of Georgia, have invented a new and useful Inner Tube, of which the following is a specification.

The device forming the subject matter of this application is an inner tube for vehicle tires, and the present invention aims to provide such a tube with a plurality of superficial corrugations, adapted to be expanded when the tube is inflated, thereby to effect a compression of the tube uniformly, both longitudinally and transversely when the tube is inflated.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawing:—Figure 1 shows in perspective, a portion of an inner tube forming the subject matter of this application; Fig. 2 is a cross section of a vehicle tire embodying the present tube, the latter being shown in the condition which it will assume after inflation; Figs. 3, 4 and 5 are fragmental transverse sections taken respectively on the lines 3—3, 4—4 and 5—5 of Fig. 1, and showing the construction of the grooves or corrugations.

In the accompanying drawings, the numeral 1 indicates an inner tube made as usual from rubber or other resilient material. The tube 1 is inclosed within a casing 2 of any desired sort carried by a rim 3, constructed as shown in the drawings or otherwise.

The inner tube 1 is provided with a plurality of superficial corrugations 4 preferably in the form of a double spiral extending around the tube. The tube 1, further, is provided with superficial grooves or corrugations 5, in the form of a double spiral, if desired, extended around the tube in intersecting relation to the corrugations 4. As shown at 6, the corrugations 4 and 5 decrease in width from the tread portion of the tube 1 toward the inner curve thereof, the corrugations being widest at the tread of the tube and being narrowest at the inner curve thereof. As shown at 7, the corrugations 4 and 5 decrease in depth from the tread portion of the tube 1 to the inner curve thereof, the corrugations being deepest at the tread of the tube, and being shallowest at the inner curve thereof.

In practical operation, when the tube 1 is disposed within the casing 2 and is inflated, the corrugations 4 and 5 flatten out or expand, thus creating a compression of the constituent material of the tube 1. Therefore, should the tube be punctured, the puncture will tend to close up, because the tube is under compression. Owing to the fact that the corrugations 4 and 5 decrease in width from the tread of the tube toward the inner curve thereof and because the corrugations decrease in depth from the tread of the tube toward the inner curve thereof, and owing to the specific relations existing between the intersecting corrugations, the compression of the tube will be uniform throughout both length of the tube and the entire cross sectional area of the constituent material of the tube.

Having thus described the invention, what is claimed is:—

1. An inner tube for vehicle tires provided with intersecting corrugations, each of the corrugations extending transversely of the axis of the tube, the corrugations being adapted to expand to create a compression of the tube when the tube is inflated.

2. An inner tube for vehicle tires, provided with diagonally disposed intersecting corrugations, the corrugations decreasing in width and in depth from the tread portion of the tube to the inner curve thereof, thereby to secure an even compression of the tube both transversely and longitudinally when the tube is inflated.

3. An inner tube for vehicle tires, provided with a circumscribing spiral corrugation, the corrugation decreasing in width and in depth from the tread part of the tube to the inner curve thereof, the corrugation being adapted to expand to create a compression of the tube when the tube is inflated.

In testimony that I claim the foregoing as my own, I have hereto affixed my signature in the presence of two witnesses.

JOHN MALLORY HUNT.

Witnesses:
JUNIUS A. CASON,
D. B. KENDRICK.